Patented Apr. 8, 1941

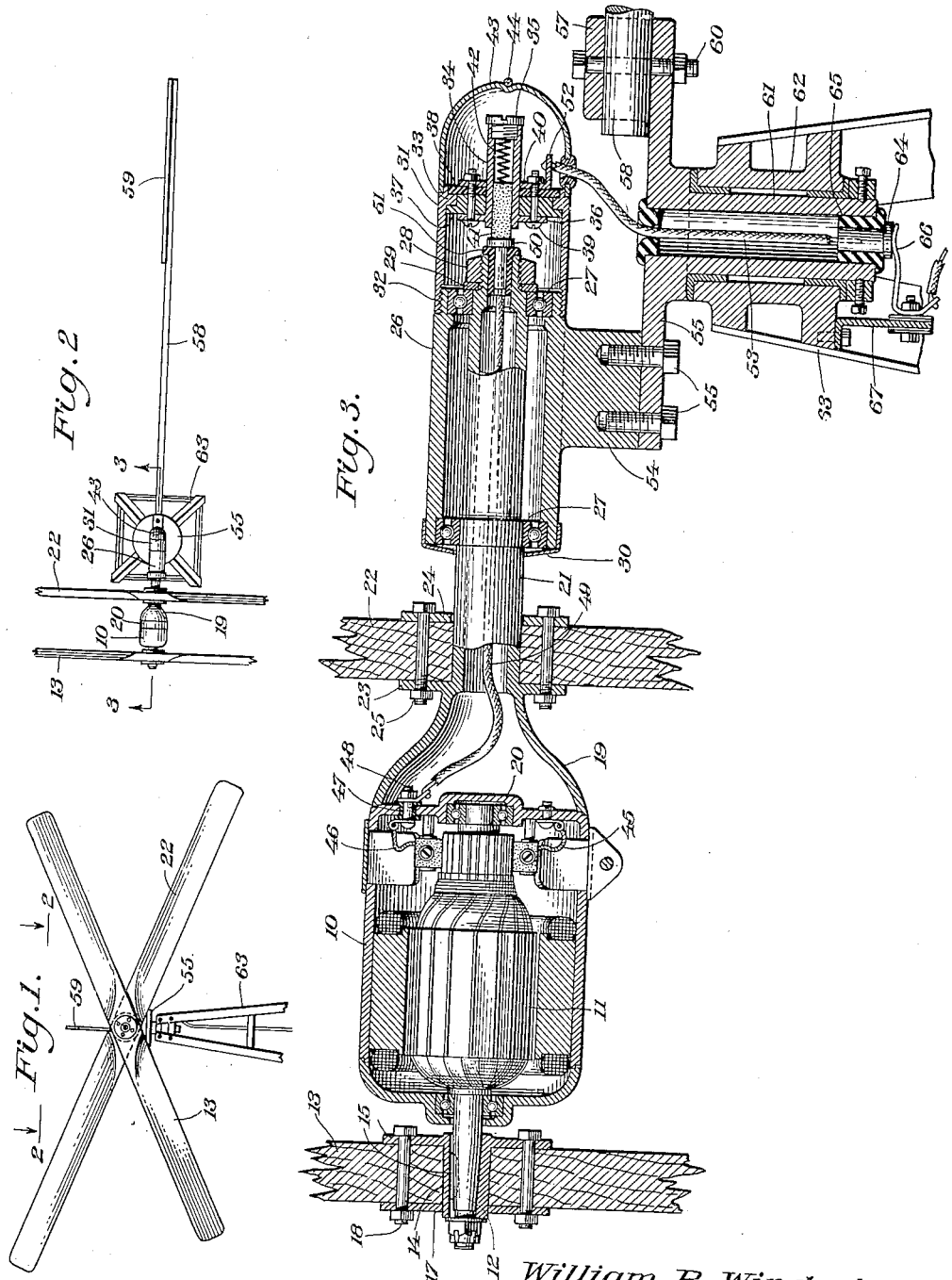

2,237,857

UNITED STATES PATENT OFFICE 2,237,857

WIND OPERATED GENERATOR

William R. Winderl, Richland, Mont.

Application February 6, 1941, Serial No. 377,726

2 Claims. (Cl. 290—44)

This invention relates to wind operated generators of the type in which the field coils are assembled with one propeller and the armature assembled with another propeller and are turned in opposite directions by the propellers.

An object of the present invention is to provide a simplified device of this character in which the generator spaces both propellers from each other.

A further object is to provide a device of this character in which the bearings for the propeller which is assembled with the field coils are mounted in a housing secured to a turntable in such manner as to be easily accessible for inspection, repairs and greasing.

A further object is to provide a device of this character which will be formed of a few strong, simple and durable parts, which will be inexpensive to manufacture, and which will not easily get out of order.

With the above and other objects in view, the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a front elevation of a wind operated generator constructed in accordance with the invention, showing the two propellers and the upper portion of the windmill tower.

Figure 2 is a plan view of the wind operated generator.

Figure 3 is a detail longitudinal sectional view, showing the propeller, generator, propeller shaft, bearings, turntable and electrical connections.

Referring now to the drawing in which like characters of reference designate similar parts in the various views, 10 designates the housing of an electric generator, 11 the armature thereof, and 12 the generator shaft. In carrying out the invention, a propeller 13 is secured to the shaft 12, the propeller having a hub 14 which is keyed to the shaft, as shown at 15. The hub is provided with an integral flange 16 and with a loose flange 17 which are disposed on opposite sides of the propeller and are bolted together through the propeller blades by bolts 18 to rigidly secure the propeller to the shaft.

The generator housing is provided with a flared extension 19, the large end of which is secured to the inner bearing plate 20 of the armature, in any preferred manner. A hollow shaft 21 is formed integral with the smaller end of the extension 19, and a second propeller 22 is secured to the hollow shaft. For this purpose, a flange 23 is formed integral with the hollow shaft at the small end of the extension 19, and a loose flange 24 is mounted on the shaft, both flanges being bolted together to clamp the propeller between them through the medium of bolts 25 which are engaged through the blades of the propeller. The housing 10 and flared extension 19 thereof are sufficient in length to space the propellers 13 and 22 sufficiently apart so that they are positively turned in opposite directions, the propellers, of course, being opposed to each other in pitch, as is customary.

A horizontally disposed bearing housing 26, in the nature of an elongated cylindrical casing is provided with spaced ball bearing assemblies 27 which mount the shaft 21 at one end to turn with anti-friction action in the bearing housing 26. The shaft is threaded at one end to receive a nut 28 which bears against the inner bearing 27 and holds the shaft against any endwise movement, there being a spacing washer 29 disposed between the nut and the bearing, as shown.

A cap 30 closes one end of the housing 26 and protects the bearing assembly at this end from the weather. The housing is provided with a cylindrical extension 31 which is screw-threadedly engaged with the housing, as shown at 32, and at the opposite end is provided with a flange 33 for securing a brush holder 34 to the extension in alignment with the bore of the hollow shaft 21.

The brush holder is formed of metal and is closed at one end by a threaded plug 35. The brush holder is provided with an integral flange 36 which is engaged against an insulating bushing 37 which bears against one side of the flange 33 of the extension 31. An insulating washer 38 is disposed on the brush holder and bears against the other side of the flange 33. Bolts 39 are passed through the integral flange 36, bushing 37, washer 38, and a metal flange 40, which is loose on the brush holder to removably secure the parts together.

A carbon brush 41 is disposed in the brush holder and at the back of the brush a helical spring 42 is compressed under the brush holder to tension between the brush and plug 35.

A removable semi-globular cap 43 is disposed on the end of the extension 31 of the bearing housing and is held in place by a conventional clamp ring 44 which permits removal of the cap to afford access to the brush so that adjustments may be made. Also the extension 31 of the housing 26 may be removed at its threaded connection 32 with the housing to permit greasing the bearing assemblies 27.

One brush of the generator is grounded by a ground wire 45 and the other brush is connected to a wire 46 which is carried through an insulating bushing 47 by means of a bolt 48 and is connected to a wire 49 which is trained through the hollow shaft 21 and is connected terminally to a contact 50, which is secured in the extreme end of the hollow shaft 21 by an insulating bushing 51. The brush bears against the contact 50, and the brush in turn is connected by an angular metal bracket 52 to a conductor wire 53, which is led to the locality where the current is to be used. The bracket 52 is formed integral with the beforementioned metal flange 40.

The horizontally disposed housing 26 is provided on the bottom intermediate the ends with an integral block 54 which is secured to a turntable 55 by bolts 56. The turntable is in the nature of a flat plate having a tubular socket 57 diametrically opposite the block 54 for receiving the stem 58 of a vane 59 which turns the turntable to position the propellers into or out of the wind, in the usual manner. A bolt 60 is engaged through the socket, through the stem, and through the turntable to secure the parts together.

The turntable is provided with a hollow vertically disposed shaft 61 which is secured in a bearing 62 mounted at the upper end of a conventional windmill tower 63.

The conductor wire 53 extends downwardly through the hollow shaft 61 and is connected to a rotary contact 64 which is secured in the bore of the hollow shaft by a bushing 65. Thus, when the turntable turns the wire 53 and bushing will turn with it. For taking off the current from the rotary contact 64, a brush 66 is secured to and insulated from a bracket 67 which is secured to the bearing 62.

Since the operation of the parts has been described as the description of the parts progressed, it is thought the invention will be fully understood without further explanation.

What is claimed is:

1. A wind operated generator comprising a pair of propellers having respectively opposite pitch, an electric generator disposed between and spacing the propellers from each other, a housing carrying the field coils of the generator and elongated at one end to form a hollow shaft projecting through and rigidly secured to one of the propellers, an armature for the generator having a shaft projecting through the motor housing and rigidly secured to the other propeller, a turntable, a tower supporting the turntable, a horizontally disposed bearing housing fixed to the turntable and receiving said hollow shaft, anti-friction bearings rotatably securing the hollow shaft in the bearing housing, a conductor wire connected to the generator and extending through said hollow housing, a conductor wire extending from the turntable into the bearing housing, and means in the bearing housing electrically connecting both conductor wires.

2. The structure as of claim 1 and in which said means includes a terminal connected to the hollow shaft and insulated therefrom having a head, a brush carried by the housing and insulated therefrom engaging said head, said conductor wire in the hollow shaft being connected to said terminal and said conductor wire carried by the turntable being connected to said brush.

WILLIAM R. WINDERL.